3,192,114
PREPARATIONS WITH PROTRACTED ACTH-EFFECT

Knut Bertil Hogberg and Ove Birger Ferno, Halsingborg, Sweden, assignors to Aktiebolaget Leo, Halsingborg, Sweden
Claims priority, application Denmark, June 21, 1952, 1,963/52
No Drawing. Filed June 17, 1953, Ser. No. 362,402
13 Claims. (Cl. 167—74)

The adrenocorticotropic hormone, in the following called ACTH, and its active peptides, are rapidly inactivated in the body, and the effect of a single dose is accordingly comparatively brief. Therefore, experiments have been made to produce ACTH-preparations with a protracted ACTH-effect, mainly by means of such methods which have been used by other medicines such as hormones and antibiotics with the same object in view. By some of these methods it has been possible to obtain preparations with a protracted ACTH-effect, but at the same time the preparations have been encumbered with considerable disadvantages. Thus a propylene glycol mixture with ACTH, to which mixture gelatine is added, has a prolonged ACTH-effect, but the preparation has the drawback that the vial, in which the preparation is contained, must be heated before the injection, since the preparation is not liquid at room temperature, just as certain precautions must also be observed in connection with the injection.

Among the methods applied to other remedies with protraction in view, the methods used in connection with insulin are of particular interest, since insulin has the character of a protein just as ACTH, and since both proteins have an isoelectric point or range at pH-values below 7. As is commonly known, one of the most important methods for the production of preparations of insulin with protracted effect is the one, in which insulin is mixed with another protein which contrary to insulin has a strongly basic character, in which connection particularly protamines and histones have been used. By the mixture a product of a salt-like character is formed. This product is difficultly soluble in water and is used in suspended form by the injection. Since both components are highmolecular, the molecules of both containing a large number of groups which may be active by the salt formation, it is not surprising that it has scarcely been possible to establish definite stoichiometric proportons according to which the combination takes place. Also ACTH may combine with protamines and in this manner a product with protracted effect may be obtained.

According to the present invention the production of preparations with a protracted ACTH-effect is carried out in a manner which certainly leads to the formation of a combined product, but which is different from that used with insulin and leads to preparations with a considerably increased and at the same time protracted ACTH-effect in comparison with ACTH and ACTH-peptides as with hitherto known preparations with protracted ACTH-effect. The method according to the invention is characterized in that ACTH or ACTH-peptides are combined in aqueous medium with high molecular, organic compounds containing acid groups derived from sulphuric acid, phosphoric acid or thiophosphoric acid. In mixture with water or aqueous media these components from a combined product which in many cases is clearly soluble in the aqueous medium at pH-values around the neutral point. That ACTH or the ACTH-peptides are present in the combined form, even in the cases where a clear solution is formed, as described above, may be demonstrated in different manners, for instance that by electrophoresis the solution shows a component having an isoelectric point, which is considerably below the isoelectric range of ACTH and ACTH-peptides, and which migrate otherwise than ACTH and ACTH-peptides. Further the solution does not show a ninhydrin reaction, which means that the α-amino acids in the combined product are blocked in such manner that they are not able to react with the said reagent. Further the combined product is not very rapidly inactivated in the body, as is ACTH or ACTH-peptides, which also finds expression in that the combined product is not at all or only slowly inactivated in vitro, when it is incubated with a homogenisate of muscle, liver or kidney at 37° C. and a pH-value of 7.4.

In certain cases, particularly with low molecular ACTH-peptides, the combined product may be difficultly soluble at pH-values around the neutral point, which does not per se inhibit the use of the preparation in therapeutics.

According to an embodiment of the invention the high molecular compounds may be such containing acid sulphuric acid ester, phosphoric acid ester or thiophosphoric acid ester groups, since this type of substance comprises some naturally occurring substances, which are suitable for, or may be made suitable for the purpose by introduction of the said acid groups, or polymers which are equally suitable for the purpose may be synthesised from the said kind of substances. That the high molecular compounds contain acid groups, which are derived from sulphuric acid, phosphoric acid or thiophosphoric acid and which are ester groups, does not prevent their also containing groups, derived from the said acids, which are not ester groups, but for instance sulphonic acid groups. Particularly by synthetic polymers, however, it may in many cases be just as expedient to use acid groups in the form of sulphonic acid, phosphoric acid or other similar groups as in the form of acid ester groups.

The lower limit for the molecular weight of the high molecular compounds which are of use according to the invention, seems to coincide with that which is required in order, that the substances should not be dialysable through common dialysis diaphragms, i.e. the molecular weight should exceed 2000, preferably 3000 and more desirably even 5000. On the other hand in order to obtain a combination of the components in which the said effects assert themselves with the desired strength, the molecular weight must not exceed a value at which the high molecular compounds are soluble in water or in aqueous alkali.

As an example of high molecular, naturally occurring compounds containing acid sulphuric acid ester groups and being usable according to the invention, heparin may be mentioned. In some naturally occurring substances, which do not contain acid groups derived from sulphuric acid, phosphoric acid or thiophosphoric acid or which contain such groups only to an insufficient degree, a sufficient content of such groups may be introduced, expediently by esterification. This applies particularly to compounds of a carbohydrate-like nature such as agar, carageen, alginic acid, dextran or hyaluronic acid. However, some of such substances have the disadvantage that they may cause a considerable increase of the viscosity in aqueous solution, but this disadvantage may be evaded by using them in a suitable depolymerized form. It applies generally to the high molecular compounds dealt with here and in the following that if the molecular weight is too high to give soluble and non-gelatinizing products, it should be reduced by a suitable depolymerization, provided, however, that the lower limit of the molecular weight must be respected.

Many compounds containing the sulphuric acid residue have an anti-coagulating effect which in some cases may be stronger than desired even if it is counteracted by ACTH having an opposite effect, and it is therefore particularly valuable that it is possible in the production of combined products according to the invention, to replace the said compounds wholly or partly with high molecular, organic compounds, in which the negative character is brought about by phosphoric acid or thiophosphoric acid residues. Thus according to an embodiment of the invention polymer condensation products are preferably used, which are condensation products of phosphoric acid or thiophosphoric acid with one or more aromatic or aromaticaliphatic compounds, containing three or more OH-, SH- or NH-groups bound to the nucleus or two such groups which are either bound to different nuclei or are in meta- or para-position to each other in the same nucleus. In these compounds the polymerization has taken place through phosphoric acid or thiophosphoric acid residues or—as may also be said—the phosphoric acid or thiophosphoric acid residues are interconnected through the said organic groups. Thus, for instance, the phosphoric acid residues in the high-molecular, organic compounds may be interconnected through di- or polyhydroxy compounds of the flavone or the flavanone series. These and related compounds are frequently found naturally, often as glycosides which have also been found suitable. In addition the di- or polyhydroxy compounds may be synthetically produced and the constitution may be varied considerably without losing their suitability as building stones in high molecular substances of the said kind. Thus also chalcones, which, as is known, are closely related to the said substances, since some of them are easily converted into flavanones, and dihydroderivatives of chalcones and flavones are suitable, at least when they contain two or more hydroxy groups or similar active groups at which the polymerization may take place. Examples of the said primary substances are: quercetin, naringenin, hesperitin, apigenin, 4,2',4',6'-tetrahydroxychalcone, 4,2',4'-trihydroxychalcone, 3,2', 4',6'-tetrahydroxy-4-methoxychalcone, 4,2',4'-trihydroxy-3-methoxychalcone, 4-methylphloretin, 2-methylphloretin, phloridzin, p-phloridzin, naringin, hesperidin and rutin. It is obvious that the possibilities are not exhausted by the substances mentioned above, but may comprise a great number of substances derived from widely differing primary substances.

The plainest primary substances, however, which may build up to high molecular substances through phosphoric acid or thiophosphoric acid residues and which may be used as one component in a preparation with protracted ACTH-effect according to the invention, are benzene substituted with two reactive groups selected from OH, SH and NH, in which the two reactive groups are not in ortho-position to each other. As examples of primary substances of this kind may be mentioned hydroquinone, resorcinol, p-phenylenediamine, m-phenylenediamine, p-thioresorcinol, m-thioresorcinol, p-aminophenol, m-aminophenol, p-aminothiophenol, m-aminothiophenol, p- and m-N-methylaminophenol, p- and m-N-alkylaminophenol, where the alkyl group is arbitrary, for instance butyl, dodecyl or octadecyl, or may be substituted by an alicyclic radical as for instance cyclohexyl, or the corresponding thiophenols.

In the benzene nucleus other substituents may be present besides the two reactive groups, for instance alkyl groups, such as methyl, butyl, hexyl, cyclohexyl, dodecyl or octadecyl groups, or nitro groups, halogen groups, for instance chlorine or bromine, carboxyl groups, sulphonic acid groups, keto groups, where the carbonyl group may be in α-position, as for instance acetyl, such acetyl substituted phenol compounds, however, being excepted in which the acetyl group is in ortho-position to a phenol group, whereby the latter is partly deactivated, so that the formation of high molecular compounds is made difficult.

More expediently, however, benzene, which is substituted with more than two of the said reactive groups, is used as a primary substance, and it is then without importance whether these groups are in vicinal, symmetric or unsymmetric position. As examples of primary substances of this kind may be mentioned: phloroglucinol, pyrogallol and hydroxyhydroquinone, symmetric aminoresorcinol, vicinal aminoresorcinol and the corresponding dithophenols, and further diaminophenols and diaminothiophenols.

Just as in the case of benzene compounds with two reactive groups, the latter benzene derivatives may be substituted in the nucleus with for instance alkyl groups, such as methyl, butyl, hexyl, cyclohexyl, dodecyl or octadecyl groups, or nitro groups, halogen groups, such as chlorine or bromine, carboxyl groups, suphonic acid groups, keto groups, in which the carbonyl group may be in α-position, as for instance acetyl, or keto groups with other position of the keto group. As examples may be mentioned: orcinol, phloroglucinaldehyde, phloracetophenone, gallic acid and gentisic acid.

The above mentioned possibilities of variation also applies to benzene which is substituted with four reactive groups.

However, according to the invention primary substances may just as well be used having several aromatic nuclei in which two or more groups of the said kind which are able to condense with phosphoric acid or thiophosphoric acid, i.e. OH, SH and NH (reactive groups for short) are bound to the nucleus in one benzene group or distributed over more nuclei. Thus in compounds of the above kind benzene may be replaced by naphthalene or by other condensed aromatic ring systems, such as anthracene and phenanthrene. Also alkyl-substituted condensed ring systems, for instance methylnaphtalene, propylnaphtalene, hexylnaphtalene, dimethylnaphtalene, methyl-ethylnaphtalene and the corresponding anthracene and phenanthrene derivatives are suitable as primary substances when they are substituted in the manner described. However, the two or more aromatic nuclei may also be interconnected otherwise. Thus anthraquinone which is substituted with two or more reactive groups, for instance 1,2,5,8-tetrahydroxyanthraquinone, has been found suitable as a primary substance. Further diphenyl, diphenylmethane, diphenylethane, triphenylethane and the three later ring systems, being substituted with alkyl, alkylene or cycloalkyl, for instance methyl, propyl, propylene, hexyl or cyclohexyl at one or both aliphatic carbon atoms, if desired, and having two or more reactive groups bound at the nucleus, are suitable as primary substances, as are also such substances being substituted with the said aliphatic or cycloaliphatic substituents in the aromatic nuclei.

In the said compounds the aromatic nuclei are interconnected through carbon bridges, but suitable primary substances are also obtained where the interconnection is through oxygen, sulphur or nitrogen bridges or through bridges containing both oxygen and sulphur or nitrogen atoms.

In the bridges not only alkyl substituents may be present, but also keto groups, as for instance in 2,4,4',6-tetrahydroxybenzophenone.

As examples of primary substances with a nitrogen bridge may be mentioned: diphenylamine, triphenylamine, di-naphtylamine, naphtylphenylamine etc., where reactive substituents are present at the aromatic nuclei as described.

As an example of primary substances, in which aromatic nuclei are interconnected by a bridge containing two nitrogen atoms, may be mentioned: azobenzene, substituted as described. Examples of substances with a bridge containing carbon as well as nitrogen are: phenylbenzylamine, dibenzylamine, tribenzylamine etc. with reactive groups as above defined at one of the aromatic nuclei at least.

In diphenyl ethers, substituted as described, there is an oxygen bridge, and these and similar compounds are also suitable as primary substances. Examples are: 4,4'-dihydroxy-diphenyl ether, 4,4'-diamino-diphenyl ether, and different tri-substituted diphenyl ethers, but also, for instance, di- and polyhydroxy- or di- and polyaminonaphthylphenyl ethers are suitable. Further corresponding derivatives of, for instance, dibenzyl ether. A more complicated oxygen-containing bridge is found in the also suitable ethylendiglycol-bis-4-hydroxy-phenyl ether.

Similar possibilities are present for the building up of suitable substances, in which sulphur makes part of a bridge, instead of oxygen, such as 4,4′-dihydroxy-diphenyl sulphide and p,p′-methylene-dithio-dianilin, both of which are suitable. Also disulphides may be used as primary substances, such as 4,4′-dihydroxydiphenyl disulphide.

An oxygen bridge between two aromatic nuclei in a molecule, substituted as described, may also be built up as an ester link, for instance in the suitable 4-hydroxy-benzoic acid-3,5-dihydroxyphenyl ester.

The above compounds which are polymer phosphoric acid compounds, including thiophosphoric acid compounds, and in which the phosphoric acid residues are interconnected through organic groups, which compounds have a molecular weight not less than 2000, but not higher than are still soluble in water or in alkali, have the common property of acting strongly inhibiting on enzymes, such as hyaluronidase. This embodiment of the invention may, therefore, also be characterized in, that ACTH is, or ACTH-peptides, are combined in an aqueous medium with high molecular, organic compounds containing acid groups derived from phosphoric acid or thiophosphoric acid and having a strongly inhibiting action against enzymes, such as hyaluronidase.

The high molecular compound may also be a condensation or polymerization product of acid phosphoric acid esters or sulphuric acid esters of an unsaturated alcohol or similar condensable or polymerizable compound, such as sulphonated polyvinyl alcohol.

The invention comprises not only a method for production of preparations having a protracted ACTH-effect, but also the preparations themselves which are of the kind prepared by the method, even if they are not prepared in the described manner.

Thus the invention relates to a preparation consisting of a combined product of ACTH, or ACTH-peptides, with high molecular, organic compounds containing acid groups derived from sulphuric acid, phosphoric acid or thiophosphoric acid and showing a negative ninhydrin reaction, which by electrophoresis shows a component having an isoelectric point considerably lower than the isoelectric range for ACTH and ACTH-peptides, and migrating otherwise than ACTH and ACTH-peptides.

Further the invention relates to a preparation consisting of a mixture of the two combining components or salts thereof, if desired with so much of an alkaline-reacting substance that an aqueous solution shows substantially neutral reaction, which mixture has the property of forming the combined product by the addition of water.

The practical way of carrying out the method according to the invention is very simple, as appears from the above, since components combine by being brought together in an aqueous solution, or if water or a water-containing medium is added to a mixture of the combining components. For the reaction itself the pH-value of the solution and the concentration is without importance, and the relative amounts of the components may be varied within wide limits. It has been found, however, that to 20 I.U. of ACTH, when this hormone is used as one of the usual preparations of the trade, less than 40 mg. of the other combining component is demanded calculated as dry substance, regardless of the fact that the hormone is accompanied by polluting substances in the preparations which are marketed. If, therefore, 40 mg. of the said combining component are used for 20 I.U. of ACTH, the desired effect will always be obtained.

As a criterion for the occurrence of the effect, the following three conditions may be used:

(1) That the substance does not give a ninhydrin reaction, (2) That an aqueous solution shows a component by electrophoresis, having an isoelectric point considerably lower than the isoelectric range of ACTH and ACTH-peptides, the said component migrating in another manner than ACTH and ACTH-peptides, and (3) That the ACTH-effect is maintained even if the preparation is incubated in a homogenisate of animal muscle, liver or kidney tissue under such circumstances that common ACTH or ACTH-peptide is inactivated.

The clinical effect of the new preparation may easily be followed by determination of eosinophilic cells in the blood. By intramuscular administration of a suitable dose, for instance 20 I.U. of common ACTH, it will be found that the number of eosinophilic cells falls to a minimum during 2–4 hours, for instance to 36% of the value before the administration of ACTH. As soon as 8 hours after the injection, however, the number of eosinophilic cells has generally increased to 50% of the original value, and in the succeeding 2 hours the amount of eosinophilic cells increases considerably. If, however, an amount corresponding to 20 I.U. of the present preparation is administrated, the content of eosinophilic cells in the blood falls during the first 4 hours just as before, but the number continues to diminish until after 8–14 hours it is down to a value, which in most cases is below 10% of the original. Yet 24 hours after the administration, the eosinophilic number has not usually increased to 50% of the original value. Correspondingly it is possible by use of the preparation according to the invention to undertake successful clinic treatments with only one injection per 24 to 48 hours. Determined by the number of eosinophilic cells the new preparation has thus not only a protracted ACTH-effect, but also an increased ACTH-effect.

We claim:

1. A preparation with protracted ACTH-effect, consisting of a reaction product of a substance selected from the group consisting of ACTH and ACTH-peptides, with a high-molecular, organic condensation product, said condensation product containing polyhydric acid radicals selected from the group consisting of phosphoric acid, thiophosphoric acid, and sulphuric acid, interconnected through polyvalent atoms of reactive groups of aromatic compounds selected from the class consisting of
   (1) mono-, di-, and polynuclear aromatic compounds carrying at least two reactive groups in meta-position at the same nucleus,
   (2) mono-, di-, and polynuclear aromatic compounds carrying at least two reactive groups in para-position at the same nucleus, and
   (3) di- and polynuclear aromatic compounds carrying at least two reactive groups at different nuclei, said reactive groups, being members of the class consisting of —OH, —SH and —NH$_2$ groups, and the linkings to said polyhydric acid being through the polyvalent atoms of said reactive groups, the said condensation product being soluble in water at alkaline pH, and having a molecular weight of at least 2,000, said reaction product showing in aqueous solution an ACTH-active component, the migration of which during electro-phoresis differs from that of ACTH and ACTH-peptides.

2. A composition forming with water a preparation with protracted ACTH-effect consisting of a dry mixture of a component selected from the group of ACTH and ACTH-peptides, with a high-molecular organic compound as set forth in claim 1, and so much of an alkaline-reacting substance that the mixture forms with water a solution with substantially neutral reaction.

3. A composition forming with water a preparation with protracted ACTH-effect consisting of a dry mixture of a salt selected from the group of salts of ACTH and ACTH peptides, with a high-molecular organic compound as set forth in claim 1.

4. A preparation as set forth in claim 1 in which the aromatic compound is a polyhydroxy flavone.

5. A preparation as set forth in claim 1 in which the aromatic compound is a glycoside of a polyhydroxy flavone.

6. A preparation as set forth in claim 1 in which the aromatic compound is a polyhydroxy flavonone.

7. A preparation as set forth in claim 1 in which the aromatic compound is a glycoside of a polyhydroxy flavonone.

8. A preparation as set forth in claim 1 in which the aromatic compound is a polyhydroxy chalcone.

9. A preparation as set forth in claim 1, in which the aromatic compound is a glycoside of a polyhydroxy chalcone.

10. A preparation as set forth in claim 1, in which the aromatic compound is a polyhydroxy dihydrochalcone.

11. A preparation as set forth in claim 1 in which the aromatic compound is a glycoside of a polyhydroxy dihydrochalcone.

12. A preparation comprising the reaction product of corticotrophin and heparin.

13. A preparation comprising the reaction product of corticotrophin and a biochemically active phosphorylated hesperidin.

References Cited in the file of this patent
UNITED STATES PATENTS

| | | |
|---|---|---|
| 2,055,083 | Klein | Sept. 22, 1936 |
| 2,662,076 | Hadidian | Dec. 8, 1953 |

OTHER REFERENCES

Mote: Procs. 2nd Clin. A.C.T.H. Conf. Therapeutics, vol. 2, 1951, pp. 2 and 3.

Cohen et al.: Soc. Exptl. Biol. and Med., vol. 82, March 6, 1953, pp. 749 to 751.

Schiller: American Journal of Physiology, vol. 165, 1951, pp. 293 to 305.

LEWIS GOTTS, *Primary Examiner.*

D. ARNOLD, W. B. KNIGHT, M. O. WOLK,
*Examiners.*